United States Patent [19]
Kalb et al.

[11] Patent Number: 4,679,669
[45] Date of Patent: Jul. 14, 1987

[54] SHOCK ABSORBER

[75] Inventors: Gerald F. Kalb, North Richland Hills; David M. Brown, Fort Worth, both of Tex.

[73] Assignee: S.I.E., Inc., Fort Worth, Tex.

[21] Appl. No.: 771,902

[22] Filed: Sep. 3, 1985

[51] Int. Cl.⁴ .............................................. F16F 7/12
[52] U.S. Cl. ...................... 188/375; 73/151; 267/125
[58] Field of Search .............. 188/375, 372; 73/151; 267/125; 74/492, 493

[56] References Cited

U.S. PATENT DOCUMENTS

| | | | |
|---|---|---|---|
| 2,113,856 | 4/1938 | Parks | 73/151 X |
| 2,577,599 | 12/1951 | Bethancourt | 73/151 |
| 2,590,233 | 3/1952 | Condra | 73/151 |
| 3,511,345 | 5/1970 | Takamatsu et al. | 188/375 |
| 3,653,468 | 4/1972 | Marshall | 188/375 |
| 3,779,591 | 12/1973 | Rands | 293/89 |
| 4,158,403 | 6/1979 | Peter | 188/375 |
| 4,214,650 | 7/1980 | Crossman et al. | 188/196 R |
| 4,346,795 | 8/1982 | Herbert | 188/375 |

FOREIGN PATENT DOCUMENTS 689878 10/1979 U.S.S.R. .............................. 74/492

*Primary Examiner*—George E. A. Halvosa
*Attorney, Agent, or Firm*—James E. Bradley

[57] ABSTRACT

A shock absorber for a wireline instrument, the shock absorber having solid, cylindrical upper body, a cylindrical sleeve, and a mandrel. The mandrel has a hexagonal upper portion, a circular center portion, and a lower nose portion. A bolt connects the mandrel to the upper body, so that the mandrel can move telescopically within the sleeve, but cannot fall out of the sleeve. Three carbide cutting elements are mounted on the sleeve adjacent to alternate sides of the upper portion of the mandrel for cutting chips of material off of the sides of the mandrel as the mandrel is moved into the sleeve.

12 Claims, 3 Drawing Figures

SHOCK ABSORBER

BACKGROUND OF THE INVENTION

1. Field of the Invention

This invention relates in general to shock absorbers, and in particular to shock absorbers for wireline instruments.

2. Description of the Prior Art

Survey instruments of various types are sometimes lowered into oil well boreholes on a wireline in order to record various downhole conditions. As an instrument is being lowered into a wellbore, the instrument will sometimes strike a ledge or the bottom of the wellbore. Because of the fragile nature of some survey instruments, it is necessary to protect such instruments from impact shocks.

A shock absorber may be defined as a device which produces a dissipative (non-recoverable) force over a given displacement to absorb energy and to remove the energy from a system. The most common type of shock absorber used on wireline instruments is a mechanical spring, mounted near the lower end of the instrument. This type of shock absorber has a disadvantage in that it tends to recoil.

U.S. Pat. No. 3,653,468 (Marshall) shows a wireline instrument shock absorber which diminishes or eliminates recoil. The shock absorber has washer-like projections, which extend radially outward from a hollow cylinder. A cutter bar slides over the hollow cylinder and engages the washer-like projections. Upon impact, kinetic energy is expended by the cutter bar shearing off some of the washer-like projects.

U.S. Pat. No. 3,779,591 (Rands) shows a shock absorbing system for use on an automobile safety bumper. This system contains a shaft and a telescoping sleeve, and connects the bumper to the vehicle structure. In a collision, the shaft is telescoped into the sleeve, and longitudinal strips of material are sheared off of the shaft by the cutting edges of the sleeve.

SUMMARY OF THE INVENTION

The general object of this invention is to absorb shocks on a wireline instrument being lowered into a wellbore. It is also an object of the invention to absorb the shocks without producing a recoil in the system.

These objects are accomplished by a shock absorber having a sleeve, and a mandrel telescopically mounted partially within the sleeve. A plurality of cutting elements are mounted on the sleeve, and cut into the mandrel as the mandrel is forced into the sleeve by the impact. As the cutting elements cut into the mandrel, chips of material are sheared from the mandrel. The force required to shear the chips from the mandrel can be adjusted by changing the rake angle of the cutting elements against the mandrel, or by changing the cross sectional area of the chips.

The upper portion of the mandrel has a polygonal cross section, and the center portion of the mandrel has a circular cross section. The cutting elements are located against alternating surfaces of the mandrel, so that after the initial surfaces have been expended, the mandrel can be rotated and reused with each cutting element against a new surface. The preferred embodiment of the mandrel has a hexagonal upper section, and three alternating cutting elements.

The above, as well as additional objects, features, and advantages of the invention, will become apparent in the following detailed description.

DESCRIPTION OF THE PREFERRED EMBODIMENT

Figure 2:
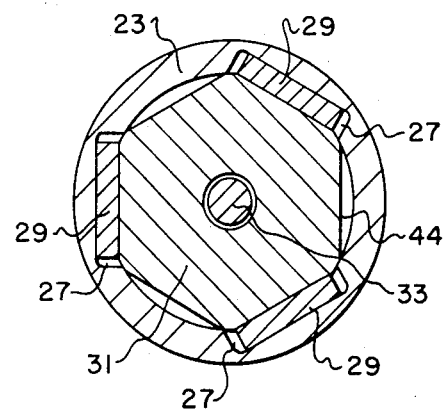
FIG. 2 is a cross section along lines 2—2 in FIG. 1.
Figure 1:
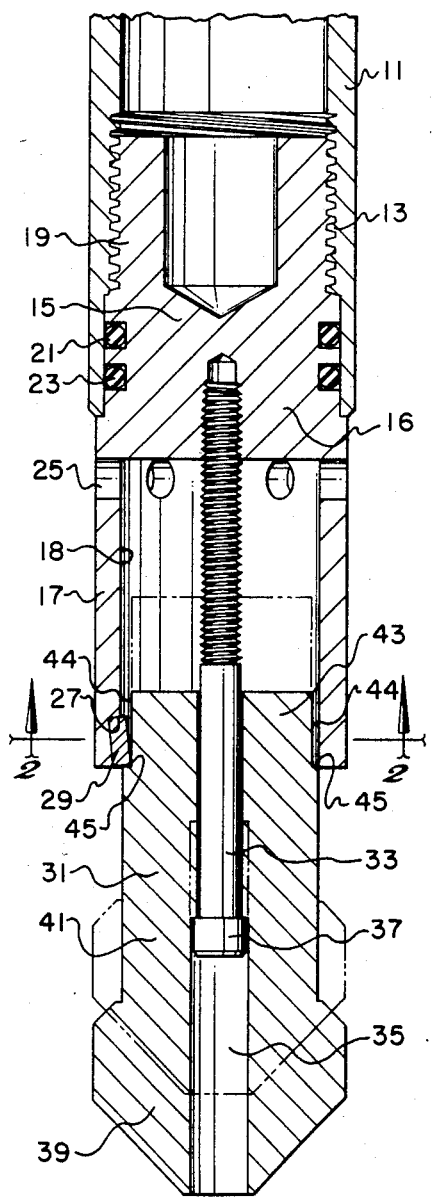
FIG. 1 is a sectional side view of a shock absorber of the invention.

FIG. 1 shows the lower end of a typical wireline instrument 11, having internal threads 13. The body 15 has a solid, cylindrical upper body 16 and a lower cylindrical sleeve 17, having an inner surface 18. The means for connecting the sleeve 17 to the wireline instrument is the upper body 16 and a threaded connection 19 on the upper body 16. The threaded connection 19 is, of course, the means for connecting the upper body 16 to the wireline instrument. A pair of O-ring seals 21,23 are a seal means for sealing between the wireline instrument 11 and the upper body 16 of the shock absorber.

Eight equally spaced ports 25 extend through the sleeve 17 near the solid upper body 16 of the shock absorber. These ports 25 allow fluid to exit the sleeve 17. Three equally spaced slots 27 are cut into the inner surface 18 of the sleeve 17, at the lower edge of the sleeve 17, and a cutting element 29 is mounted in each of the three slots 27. The cutting elements 29 are preferably carbide inserts.

A brass mandrel 31 is connected to the upper body 16, and the means for connecting the mandrel 31 to the upper body 16 is a bolt 33. The bolt 33 extends through an axial passage 35 in the mandrel 31, through the center of the sleeve 17, and is threaded into the solid upper section of the body 15. The mandrel 31 is loosely connected to the upper body 16, and the weight of the mandrel 31 is supported by the head 37 of the bolt 33. Therefore, the mandrel 31 can move telescopically within the sleeve 17, but the mandrel 31 cannot fall out of the sleeve 17.

The lower nose portion 39 of the mandrel 31 has a circular cross section and is of approximately the same diameter as the outer diameter of the sleeve 17. The center portion 41 of the mandel 31 also has a circular cross section and is of approximately the same diameter as the inner diameter of the sleeve 17. The upper portion 43 of the mandrel 31 has a polygonal cross section with a plurality of sides. In the preferred embodiment of the invention, the upper portion 43 of the mandrel 31 has a hexagonal cross section with six sides 44. The junctions between these six sides 44 and the center portion 41 of the mandrel 31 form six shoulders 45. When the shock absorber is assembled, the three carbide inserts 29 are located adjacent to three alternate sides 44 of the upper portion 43 of the mandrel 31.

Figure 3:
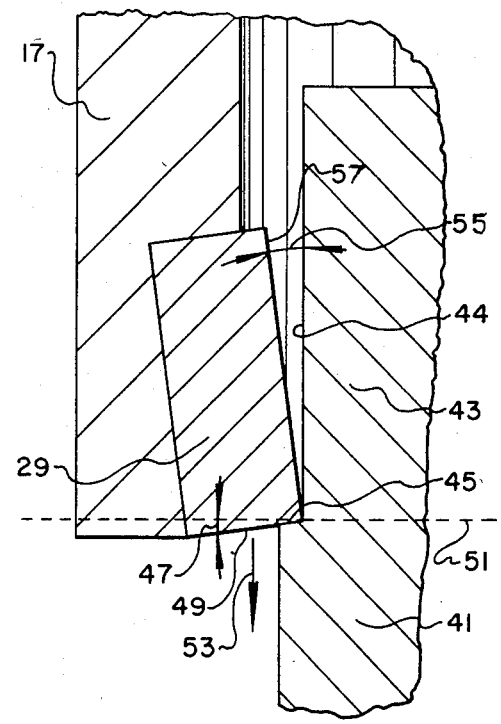
FIG. 3 is a sectional view of a cutting element.

In FIG. 3 it can be seen that the preferred cutting elements 29 are rectangular in cross section. The cutting element 29 is mounted at a rake angle 47, defined as the angle between the front face 49 of the cutting element 29 and a plane 51 perpendicular to the direction of travel 53 of the cutting element 29. If the plane 51 passes through the cutting element 29, as shown in FIG. 3, then the rake angle 47 is considered to be negative.

A negative rake angle 47 will cause the cutting element 29 to cut chips of material off of the mandrel 31, rather than to peel material away in a continuous strip.

Also, since the cutting element 29 is rectangular, a negative rake angle 47 will also produce a clearance angle 55 between the inner surface 57 of the cutting element 29 and the side 44 of the upper portion 43 of the mandrel 31. The clearance angle 55 will be equal to the rake angle 47. The clearance angle 55 prevents sliding contact between the inner surface 57 of the cutting element 29 and the side 44 of the mandrel 31.

The shear force required to cut chips of material away from the mandrel 31 can be adjusted by changing the rake angle 47 or by changing the cross sectional area of the cut. A steeper rake angle 47 or a larger cross sectional area, will require a greater force. The rake angle 47 may range from 0° to about −20°, but the preferred rake angle is about −5°. The cross sectional area may vary within the limits of the geometry of the mandrel 31.

In operation, the wireline instrument is lowered into the wellbore with the shock absorber on the lower end. When the nose 39 of the mandrel 31 contacts a ledge or the bottom of the wellbore, the mandrel 31 is forced upward into the sleeve 17. As the mandrel 31 moves upward, the carbide inserts 29 contact the shoulders 45.

As the mandrel 31 moves into the sleeve 17, the inserts 29 cut chips of material off of the center portion 41 of the mandrel 31. The kinetic energy of the wireline instrument 11 is converted into mechanical energy as the cutting elements 29 chip away at the mandrel 31. The mandrel 31 may move into the sleeve 17 to a position such as shown in the dotted lines in FIG. 1.

When the wireline instrument 11 has been removed from the wellbore, the shock absorber can be reset and reused. The mandrel 31 can be pulled out of the sleeve 17, and rotated 60°, so that the cutting elements 29 contact the three unused shoulders 45. Thus, the mandrel can be used several times before it is replaced.

The invention has several advantages over the prior art. The shock absorber of the invention absorbs shocks on a wireline instrument being lowered into a wellbore, without producing a recoil in the system. The rake angle and cut depth of the cutting elements can be selected to adjust the force required to shear the chips of material off of the mandrel. After several uses, the mandrel can be reused by placing the cutting elements against different sides of the mandrel.

While the invention has been shown in only one of its forms, it should be apparent to those skilled in the art that it is not so limited, but is susceptible to various changes and modifications without departing from the spirit thereof.

We claim:

1. A shock absorber for a wireline instrument for use in a liquid containing well to reduce sock if the instrument impacts on an object while being lowered, said shock absorber comprising:
   a sleeve, having an inner surface;
   a mandrel, telescopically movable within the sleeve from an outward extended position to an inward retracted position if a sufficient impact of the instrument occurs, the mandrel having an outward portion with a smooth cylindrical surface and an inward portion located inward of the outward portion, which has a polygonal cross section with a plurality of flat sides defining an annular shoulder between the inward and outward portions;
   means for connecting the sleeve and mandrel to the wireline instrument; and
   a plurality of separate cutting elements, each mounted on the inner surface of the sleeve, each cutting element having a flat cutting edge in contact with one of the flat sides of the inward portion of the mandrel and bearing against the shoulder, each cutting element being mounted at a rake angle which is negative with a cutting edge inclined outwardly toward the outward portion of the mandrel and into the material being cut for cutting chips of material off of the outward portion of the mandrel as the mandrel is moved inward into the sleeve due to an impact.

2. A shock absorber as recited in claim 1, wherein the sleeve is cylindrical and has a plurality of ports for allowing said liquid to enter the sleeve while the instrument is immersed in a well, and to exit the sleeve as the mandrel moves inwardly due to an impact.

3. A shock absorber as recited in claim 1, wherein there are twice as many flat sides as cutting elements, with the cutting elements in contact with alternate flat sides, to enable the mandrel to be rotated and extended outward to a new position with the cutting elements in contact with other of the flat sides for reuse after absorbing an impact.

4. A shock absorber as recited in claim 1, wherein the cutting element is rectangular and is mounted at a negative rake angle.

5. A shock absorber as recited in claim 1, wherein the means for connecting the sleeve to the wireline instrument comprises:
   a solid, cylindrical upper body; and
   means for connecting the body to the wireline instrument.

6. A shock absorber as recited in claim 5 wherein the mandrel further comprises a lower nose portion which has a circular cross section of a diameter equal to the outer diameter of the sleeve.

7. A shock absorber as recited in claim 5, further comprising means for connecting the mandrel to the upper body, so that the mandrel can move telescopically within the sleeve, but the mandrel cannot fall out of the sleeve.

8. A shock absorber as recited in claim 5 wherein the means for connecting the upper body to the wireline instrument in a threaded connection on the upper body.

9. A shock absorber as recited in claim 8 further comprising seal means for sealing between the the upper body and the wireline instrument.

10. A shock absorber for a wireline instrument for use in a liquid containing well to reduce shock if the instrument impacts on an object while being lowered, said shock absorber comprising:
    a body;
    means for connecting the body to the wireline instrument;
    a cylindrical sleeve, extending from the body, said sleeve having a plurality of equally spaced ports for allowing said liquid to flow into the sleeve while the instrument is immersed in said liquid in a well;
    a mandrel telescopingly movable within the sleeve from an outward extended position to an inward retracted position if sufficient impact on the instrument occurs, the mandrel having an inward portion which has a polygonal cross section with a plurality of flat sides and which is located within the sleeve, an outward portion which extends outward from the sleeve and which has a circular cross section of a diameter equal to the inner diameter of the sleeve, defining an annular shoulder between the inward portion and the outward portion;

shaft means, extending from the mandrel into the body, for telescopically connecting the mandrel to the body, so that the mandrel can move telescopingly into the sleeve, but the mandrel cannot detach completely out of the sleeve; and a plurality of carbide cutting elements, each mounted on the sleeve in contact with one of the flat sides of the inward portion of the mandrel and bearing against the shoulder, for cutting chips of material off of the sides of the outward portion of the mandrel as the mandrel is moved into the sleeve due to an impact of the wireline instrument on an object;

each cutting element being mounted at a rake angle which is negative, with a cutting edge inclining outwardly toward the outward portion of the mandrel and into the material being cut.

11. A shock absorber as recited in claim 10, wherein the shaft means comprises a shaft rigidly mounted to the body and extending downwardly into an axial passage provided in the mandrel, the shaft having an upwardly facing shoulder on its lower end, the passage having a downwardly facing shoulder spaced above the shoulder on the shaft and having an inner diameter less than the shoulder on the shaft to retain the mandel on the shaft.

12. A shock absorber for a wireline instrument, said shock absorber comprising:

a sleeve;

a mandrel, telescopically mounted within the sleeve and movable from an outward extended position to an inward retracted position if sufficient impact of the instrument occurs, the sleeve and mandrel having mating sliding surfaces;

connection means for mounting the sleeve and mandrel to the wireline instrument;

one of the sliding surfaces having a polygonal portion with a plurality of flat sides and a cylindrical portion, defining a shoulder at their junction;

a plurality of cutting elements, mounted to the other sliding surface, each in contact with one of the flat sides and bearing against the shoulder, for cutting chips of material off of the sides of the cylindrical portion as the mandrel is moved into the sleeve, the cutting element being mounted at a negative rake angle with a cutting edge that is inclined forwardly into the direction of the cut being made; and the sleeve having a plurality of ports for allowing said liquid to enter the sleeve while the instrument is immersed in said liquid in the well, and to exit the sleeve as the mandrel moves inwardly due to an impact.

* * * * *